US010911537B1

(12) United States Patent
Chepel et al.

(10) Patent No.: US 10,911,537 B1
(45) Date of Patent: Feb. 2, 2021

(54) INCREASING SPEED OF SYNCHRONIZATION AND RESTORE

(71) Applicant: Acronis International GmbH, Schaffhausen (CH)

(72) Inventors: Dmitry Chepel, Moscow (RU); Stanislav Protasov, Moscow (RU); Serguei M. Beloussov, Costa del Sol (SG)

(73) Assignee: ACRONIS INTERNATIONAL GMBH

(*) Notice: Subject to any disclaimer, the term of this patent is extended or adjusted under 35 U.S.C. 154(b) by 37 days.

(21) Appl. No.: 14/986,164

(22) Filed: Dec. 31, 2015

Related U.S. Application Data (60) Provisional application No. 62/098,558, filed on Dec. 31, 2014.

(51) Int. Cl.
    *H04L 29/08* (2006.01)
(52) U.S. Cl.
    CPC ...... *H04L 67/1095* (2013.01); *H04L 67/1097* (2013.01)
(58) Field of Classification Search
    CPC ............. H04L 67/1095; H04L 67/1097; H04L 63/123; G06F 21/6218; G06F 16/278; G06F 11/1451; G06F 11/1469; G06F 11/1464
    See application file for complete search history.

(56) References Cited

U.S. PATENT DOCUMENTS

| | | | |
|---|---|---|---|
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,418,620 B1 * | 8/2008 | Tormasov | G06F 11/1076 714/6.24 |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |

(Continued)

*Primary Examiner* — Moustafa M Meky
*Assistant Examiner* — Kidest Mendaye
(74) *Attorney, Agent, or Firm* — K&L Gates LLP (57) ABSTRACT

A method, computer program product, computing system, and system for increasing speed during synchronization or restore are described. The method may include acquiring list of items to be synchronized or restored. The method may further include defining a set of storage sources available to a client computer. The method may also include mounting the available storage sources to the client computer. The method may additionally include determining a storage intersection of items in the list based on the items being available in more than one mounted storage device. Moreover, the method may include, in response to determining a set of items that has a storage intersection, synchronizing or restoring the items based on at least one of a speed of download and a network latency.

10 Claims, 6 Drawing Sheets

(56) References Cited

U.S. PATENT DOCUMENTS

| | | |
|---|---|---|
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 9,137,780 B1* | 9/2015 | Olsen ............... G06F 3/0659 |
| 9,483,359 B2* | 11/2016 | Montulli ........... G06F 11/1451 |
| 9,547,559 B2* | 1/2017 | Whitehead ............ G06F 11/14 |
| 9,626,367 B1* | 4/2017 | Kokotovich ........ G06F 11/1456 |
| 2005/0010616 A1* | 1/2005 | Burks ............... G06F 11/1453 |
| 2006/0225065 A1 | 10/2006 | Chandhok et al. |
| 2009/0271412 A1* | 10/2009 | Lacapra ............... H04L 67/104 |
| 2010/0011178 A1 | 1/2010 | Feathergill |
| 2010/0257142 A1* | 10/2010 | Murphy ............ G06F 11/1464 |
| | | 707/681 |
| 2010/0332401 A1* | 12/2010 | Prahlad ............ G06F 17/30082 |
| | | 705/80 |
| 2013/0218837 A1* | 8/2013 | Bhatnagar ......... G06F 17/30174 |
| | | 707/624 |
| 2014/0172783 A1* | 6/2014 | Suzuki ................... G06F 8/63 |
| | | 707/609 |

\* cited by examiner

INCREASING SPEED OF SYNCHRONIZATION AND RESTORE

CROSS-REFERENCE TO RELATED APPLICATIONS

This application claims priority to and the benefit of U.S. Provisional Patent Application No. 62/098,558 filed on Dec. 31, 2014, the disclosure of which is herein incorporated by reference in its entirety.

TECHNICAL FIELD

The technical field may generally relate to synchronizing and restoring items in a computer.

BACKGROUND

A common problem is slow speed during synchronization with remote data storage (e.g., cloud storages) or slow restore from such storage. The slow speed may be due to limitations of the channel or network (e.g., a bad connection, a slow connection speed, etc.). Further, with a large number of files in file recovery or backup, a lot of information must be read (e.g., file contents). This may increase run time.

BRIEF SUMMARY

In an embodiment, a method for increasing speed of synchronization and restore may include acquiring list of items to be synchronized or restored. The method may further include defining a set of storage sources available to a client computer. The method may also include mounting the available storage sources to the client computer. The method may additionally include determining a storage intersection of items in the list based on the items being available in more than one mounted storage device. Moreover, the method may include, in response to determining a set of items that has a storage intersection, synchronizing or restoring the items based on at least one of a speed of download and a network latency. Further, the method may include, in response to determining a set of items that does not have a storage intersection, synchronizing or restoring the items from a primary remote storage.

One or more of the following features may be included. The method may include performing a file hash calculation on a mounted storage source. The method may further include comparing hash file from the list of items with hashes of files from the mounted storage sources. The method may also include, in response to determining a collision of hashes, synchronizing or restoring the corresponding items from an appropriate mounted storage source. Additionally, the method may include, in response to determining no matching hashes synchronizing or restoring the corresponding items from a backup archive. In one embodiment, the method is updated such that prior to restoring the items from the primary remote storage, the steps of determining if the items are available at a local storage device; and if the items are available at the local storage device, restoring the items from the local storage device in lieu of restoring the items from the primary remote storage are performed.

In an embodiment, a computer program product may reside on a computer readable storage medium and may have a plurality of instructions stored on it. When executed by a processor, the instructions may cause the processor to perform operations for increasing speed of synchronization and restore. The operations may include acquiring list of items to be synchronized or restored. The operations may further include defining a set of storage sources available to a client computer. The operations may also include mounting the available storage sources to the client computer. Additionally, the operations may include determining a storage intersection of items in the list based on the items being available in more than one mounted storage device. Moreover, the operations may include, in response to determining a set of items that has a storage intersection, synchronizing or restoring the items based on at least one of a speed of download and a network latency. The operations may also include, in response to determining a set of items that does not have a storage intersection, synchronizing or restoring the items from a primary remote storage. The operations may further include prior to restoring or synchronizing the items from the primary remote storage, determining if the items are available at a local storage device; and if the items are available at the local storage device, restoring the items from the local storage device in lieu of restoring the items from the primary remote storage.

One or more of the following features may be included. The operations may include performing a file hash calculation on a mounted storage source. The operations may include performing a hash calculation with regard to a data item on a mounted storage source. The operations may further include comparing hash file or from the list of items with hashes of files from the mounted storage sources. The operations may also include, in response to determining a collision of hashes, synchronizing or restoring the corresponding items from an appropriate mounted storage source. Additionally, the operations may include, in response to determining no matching hashes, synchronizing or restoring the corresponding items from a backup archive.

In an embodiment a computing system for increasing speed of synchronization and restore may include one or more processors. The one or more processors may be configured to acquire list of items to be synchronized or restored. The one of more processors may be further configured to define a set of storage sources available to a client computer. The one of more processors may also be configured to mount the available storage sources to the client computer. The one of more processors may additionally be configured to determine a storage intersection of items in the list based on the items being available in more than one mounted storage device. Moreover, the one of more processors may be configured to, in response to determining a set of items that has a storage intersection, synchronize or restore the items based on at least one of a speed of download and a network latency. Further, the one of more processors may be configured to, response to determining a set of items that does not have a storage intersection, synchronize or restore the items from a primary remote storage.

One or more of the following features may be included. The one or more processors may be configured to perform a file hash calculation or hash calculation regarding any types of data items on a mounted storage source. In one embodiment, the file hash calculation includes performing a hash calculation with regard to data items including restorable data items on a mounted storage source. The one or more processors may also be configured to compare a hash file from the list of items with hashes of files from the mounted storage sources. The one or more processors may also be configured to compare results of hash calculation from the list of items with hash calculation from the mounted storage sources. The one or more processors may further be configured to, in response to determining a collision of hashes, synchronizing or restoring the corresponding items from an appropriate mounted storage source. Additionally, the one or more processors may be configured to, in response to determining no matching hashes, synchronizing or restoring the corresponding items from a backup archive.

In an embodiment, a system for increasing speed of synchronization and restore may include one or more items to be synchronized or restored to a primary storage source. The system may further include one or more mountable storage sources where a portion of the one or more items are stored. The system may also include a local area network including at least one of the mountable storage sources. Additionally, the system may include an application configured to synchronize or restore the items from the mountable storage devices based on at least one of a speed of download and a network latency. In one embodiment, the system is configured wherein prior to restoring or synchronizing the items from the primary remote storage, determining if the items are available at a local storage device; and if the items are available at the local storage device, restoring the items from the local storage device in lieu of restoring the items from the primary remote storage.

The details of one or more implementations are set forth in the accompanying drawings and the description below. Other features and advantages will become apparent from the description, the drawings, and the claims.

DETAILED DESCRIPTION

Overview

A cloud provider or virtualization or system administrator may institute backup and recovery procedures to ensure persistence of a tenant's applications, data, or other resources accessed through one or more physical or virtual machines ("VM"). For example, a backup archive of the physical or virtual machine may be created and stored onsite or offsite and may include the entire content of the physical or virtual machine before it failed. The physical or virtual machine may subsequently need to be restored or synchronized.

The techniques and features describe in the present disclosure may implement a synchronization/restore system which may work faster with a remote storage, due in part to the fact that every file may be read from a network separately. Maximum improvement may be achieved in the optimization (using the technology described) of network operations. There may be a problem with restoring/copying data locally. In some cases it is possible to achieve results and to recover data from a local disk.

Figure 1:
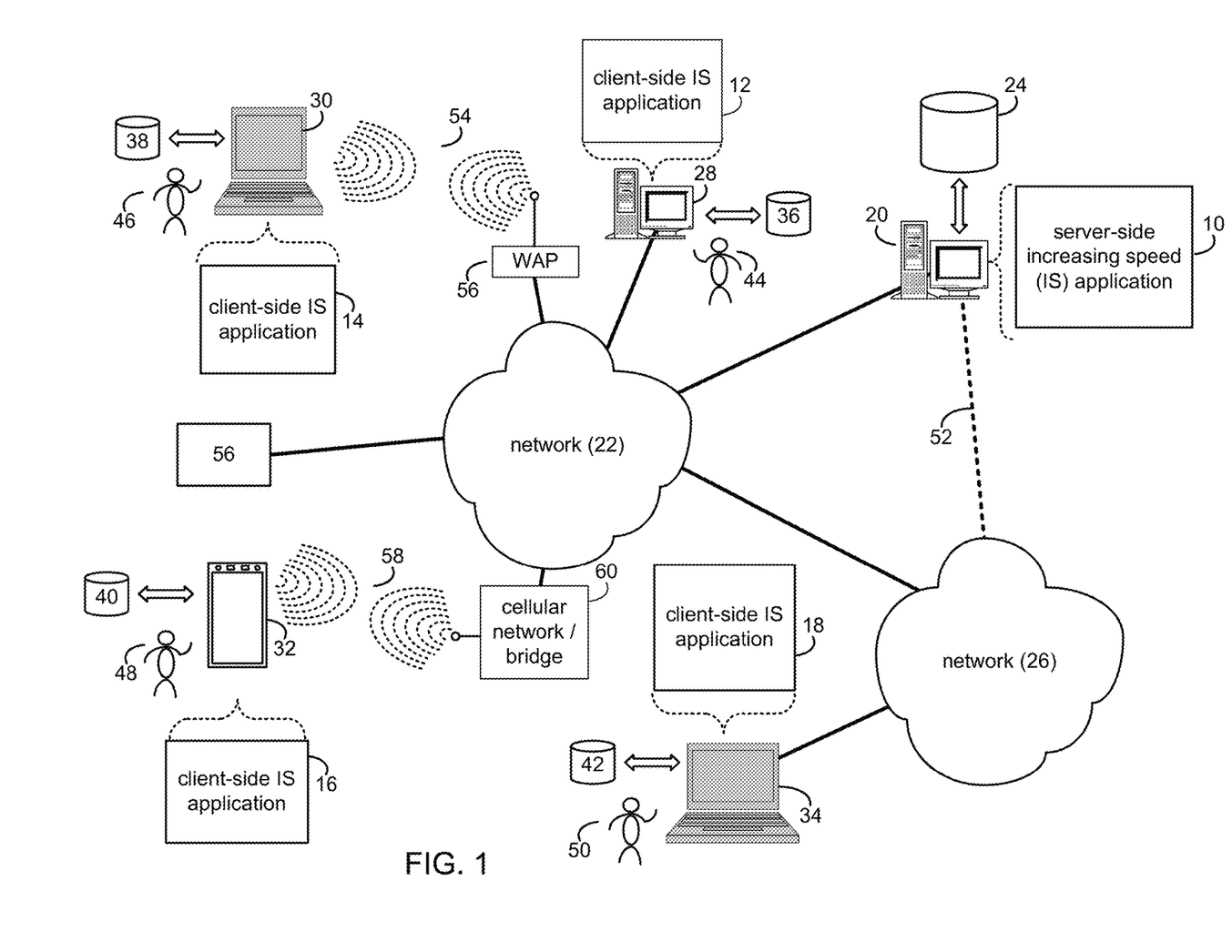
FIG. 1 depicts an example system that can execute implementations of the present disclosure.
Figure 3:
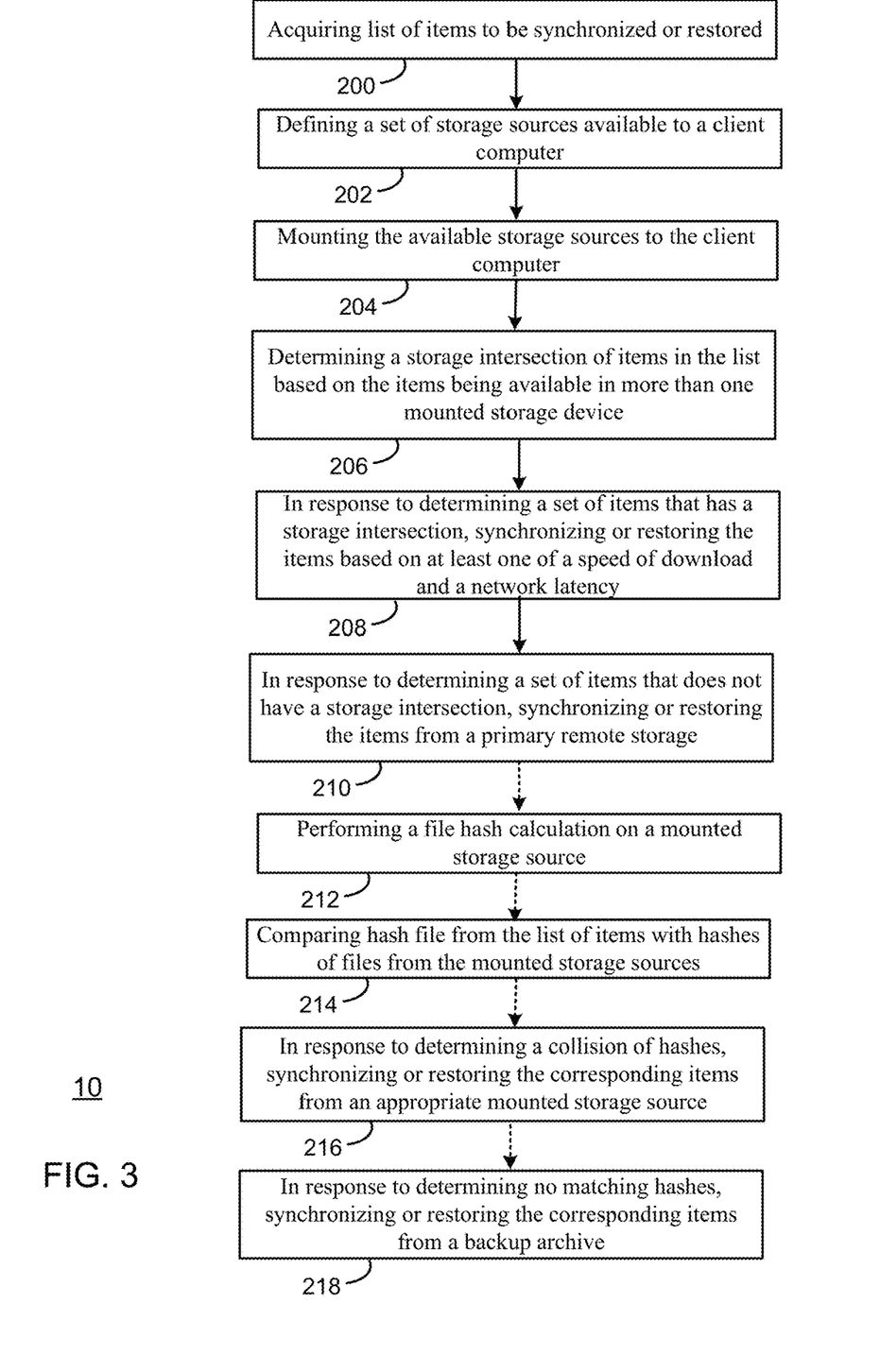
FIG. 3 is a flowchart illustrating an example process for increasing speed during synchronization or restore in accordance with the present disclosure.

Referring to FIGS. 1 & 3, there is shown a server-side increasing speed (IS) application 10 and client-side IS applications 12, 14, 16, and 18. Server-side IS application 10 and/or one or more of client-side IS applications 12, 14, 16, and/or 18 may execute one or more processes configured to carry out one or more of the features described herein. Server-side IS application 10 may be referred to as a process configured to carry out one or more of the features described herein, such as IS process 10. Further, one or more of client-side IS applications 12, 14, 16, and 18 may be referred to as a process configured to carry out one or more of the features described herein, such as IS processes 12, 14, 16, and/or 18.

As will be discussed below, IS process 10 may acquire 200 list of items to be synchronized or restored. IS process 10 may also define 202 a set of storage sources available to a client computer. IS process 10 may further mount 204 the available storage sources to the client computer. IS process 10 may additionally determine 206 a storage intersection of items in the list based on the items being available in more than one mounted storage device. Moreover, IS process 10 may, in response to determining a set of items that has a storage intersection, synchronize or restore 208 the items based on at least one of a speed of download and a network latency. IS process 10 may also, in response to determining a set of items that does not have a storage intersection, synchronize or restore 210 the items from a primary remote storage. Further, IS process 10 may perform 212 a file hash calculation on a mounted storage source. Additionally, IS process 10 may compare 214 a hash file from the list of items with hashes of files from the mounted storage sources. Moreover, IS process 10 may, in response to determining a collision of hashes, synchronize or restore 216 the corresponding items from an appropriate mounted storage source. IS process 10 may further, in response to determining no matching hashes, synchronize or restore 218 the corresponding items from a backup archive.

The IS process may be a server-side process (e.g., server-side IS process 10), a client-side process (e.g., client-side IS process 12, client-side IS process 14, client-side IS process 16, or client-side IS process 18), or a hybrid server-side/client-side process (e.g., a combination of server-side IS process 10 and one or more of client-side IS processes 12, 14, 16, 18).

System Overview

Referring to FIG. 1, server-side IS process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side IS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side IS processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side IS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side IS processes 12, 14, 16, 18 and/or server-side IS process 10 may be processes that run within (i.e., are part of) a cloud computing site, cloud computing application, cloud platform, or cloud environment. Alternatively, client-side IS processes 12, 14, 16, 18 and/or server-side IS process 10 may be stand-alone applications that work in conjunction with the cloud computing site, cloud computing application, cloud platform, or cloud environment. One or more of client-side IS processes 12, 14, 16, 18 and server-side IS process 10 may interface with each other (via network 22 and/or network 26).

Users 44, 46, 48, 50 may access server-side IS process 10 directly through the device on which the client-side IS process (e.g., client-side IS processes 12, 14, 16, 18) is executed, namely client electronic devices 28, 30, 32, 34, for example. Users 44, 46, 48, 50 may access server-side IS process 10 directly through network 22 and/or through secondary network 26. Further, server computer 20 (i.e., the computer that executes server-side IS process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

IS Process

For the following discussion, server-side IS process 10 will be described for illustrative purposes. It should be noted that server-side IS process 10 may interact with client-side IS process 12 and may be executed within one or more applications that allow for communication with client-side IS process 12. However, this is not intended to be a limitation of this disclosure, as other configurations are possible (e.g., stand-alone, client-side IS processes and/or stand-alone server-side IS processes). For example, some implementations may include one or more of client-side IS processes 12, 14, 16, 18 in place of or in addition to server-side IS process 10.

The systems and methods (e.g., IS process 10) described herein relate to the backup and/or restoration of data in a physical or virtualized environment (e.g., vSphere environment 64). The systems described herein may include one or more memory elements for backup of software and databases, virtual machines, and computer storage products including instructions to be executed by a processor to cause the processor to implement the methods described herein. The systems described herein may also include a backup archive, where the VM backup file, backup archive file, or backup contents may be located; the backup archive may be disposed in a memory, a portion of a memory, or across one or more memories Referring now to FIG. 1, one or more of users 44, 46, 48, and 50 may be individuals or cloud or virtualization or system administrators at a cloud or virtualization provider or may be cloud or virtualization end-users. The cloud or virtualization administrators may access and administer a cloud or virtualization computing site and the end users may access and interact with the computing site through one or more of client electronic devices 28, 30, 32, 34 (respectively). The computing site may run a cloud or virtualization application such as VMWare™ or may include bare-metal embedded hypervisors (e.g., VMware™ ESX™ and VMware™ ESXi™) that may run directly on server hardware at computing site 20. Further, the computing site may include a vCloud™ architecture that may enhance cooperation between hypervisors.

Figure 2:
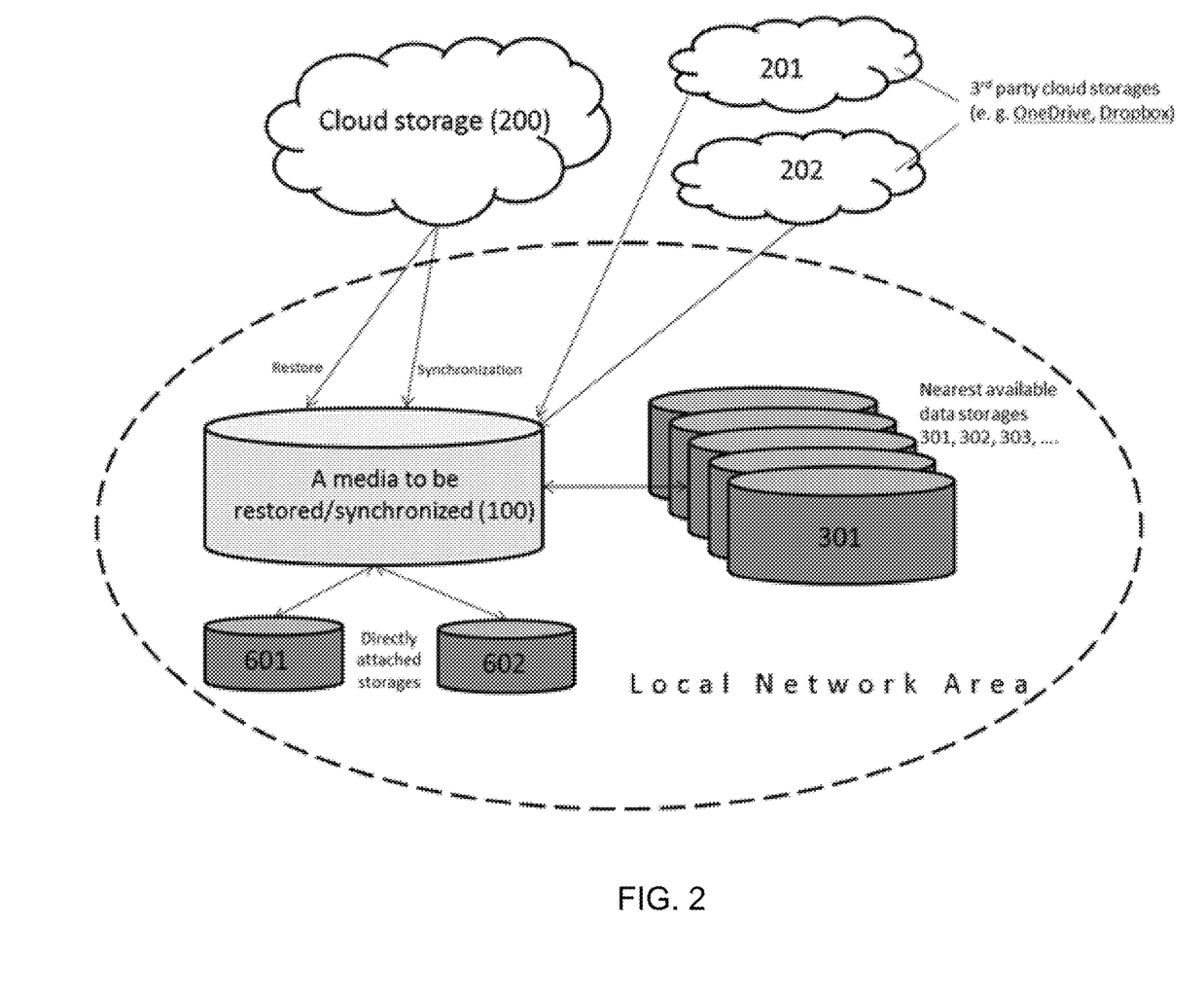
FIG. 2 depicts an example infrastructure in accordance with the present disclosure.

Referring now to FIG. 2, a storage media (100) may be chosen for synchronization or restoration (e.g., may be target media to restore) or may need to synchronize its data with a remote storage/cloud storage (200). It may partially contain the necessary data. Some file storages 300, 302, 303, etc. (e.g., NAS or network shared folders) may be available in a local network, and any directly attached storages such as DAS (601, 602) may contain files that need to be restored (or synchronized).

Further, there may be a list of items or files that should be restored or moved to the storage (100) from the cloud. This list may be part of one of the stores. The list may be stored on an online backup server or on any available storage. Each storage may have a metadata or file index that may describe its content. If necessary, the metadata can be created. Each storage may include a collection of files and directories. Further, each file and directory may have the following attributes in the metadata: size, modification time, hash, name, list of child files, and attributes, if necessary. Each storage (i.e., storage source) may have the following a download speed (Vdownload) and a latency (Tlatency). If when the storage is closest to the restored media (100), it may have a sufficiently low V and high T, compared with other sources.

Figure 4:
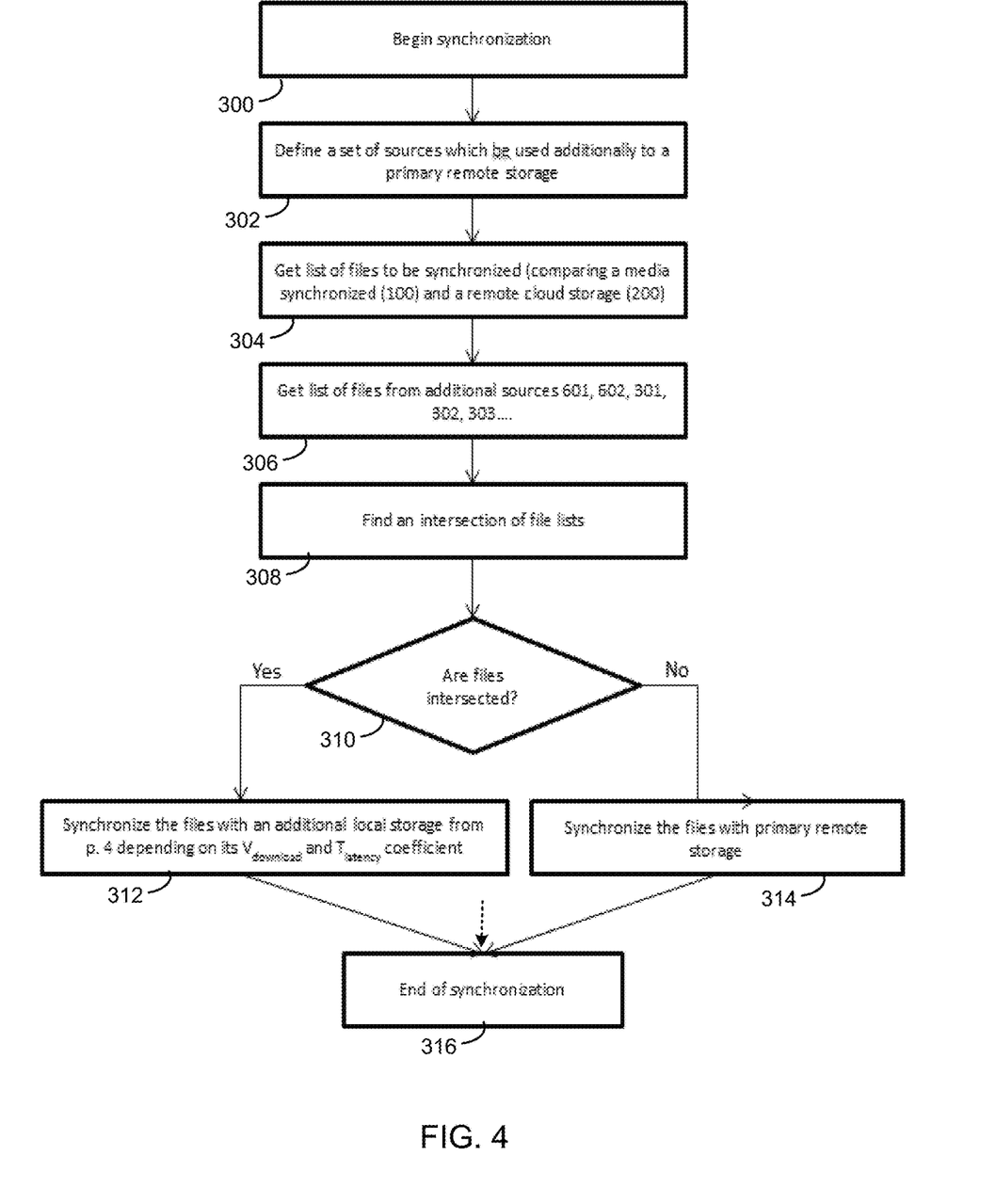
FIG. 4 is a flowchart illustrating an example process backup process in accordance with the present disclosure.

Referring now to FIGS. 3 and 4, a restore or synchronization process may begin (300). IS process 10 may acquire 200 (304) list of items to be synchronized or restored. The list of items may also be created, e.g., by a user. The items may be files, folder trees, etc. Further, the list (of files for example) may reside on a backup archive or may be downloaded from an online backup). The list of the files may include at least files name and hashes of the files.

A user may have a set of files on a remote storage. There may be a set of files on the local drive. The intersection may be a logical operation that returns the general concepts from multiple sets or on what grounds. In this case, if the contents of the file are unique, it is taken from a remote cloud storage only. Those files may exist in the local and remote source copied/restored from a local source.

IS process 10 may also define 202 (302) a set of storage sources available to a client computer. The set of storage sources may be used in addition to a primary remote storage. The list of files to be synchronized or (restored) may be acquired, and, for example IS process 10 may compare to media to be synchronized (100) with a remote cloud storage (200). A list of files from additional storage sources 301-303, and 601-602 may also be acquired (306). IS process 10 may further mount 204 the available storage sources to the client computer. Available storage sources (i.e., available storage) may provide access to an index hash of all files on it. Available storage may include at least one of: network-attached storage (NAS), which may be a file-level computer data storage connected to a computer network, cataloging storage, archive files and backups, and images of redistributable software. If a mounted storage does not include file index hashes, IS process 10 may perform a hash calculation with regard to a file or other data item on a mounted storage source.

In an implementation, a user may determine which storage sources may participate in the recovery. The user may determine which files and directories are used when restoring. An area may be prepared to restore or synchronize. There may be 3 types of sources for synchronization: a remote cloud source (primary source where all the files are stored) a local storage attached directly to the media restored. It may include some of the files to be restored/synchronized, or sometimes may include all the files. Any other data storage devices may be located in the same local network as a target media (100). The other data storage devices also can contain all or some of the files.

IS process 10 may additionally determine 206 (308) a storage intersection of items in the list based on the items being available in more than one mounted storage device. Moreover, IS process 10 may, in response to determining (310) a set of items that has a storage intersection, synchronize or restore 208 (312) the items based on at least one of a speed of download and a network latency. IS process 10 may also, in response to determining a set of items that does not have a storage intersection, synchronize or restore 210 (314) the items from a primary remote storage.

Figure 5:
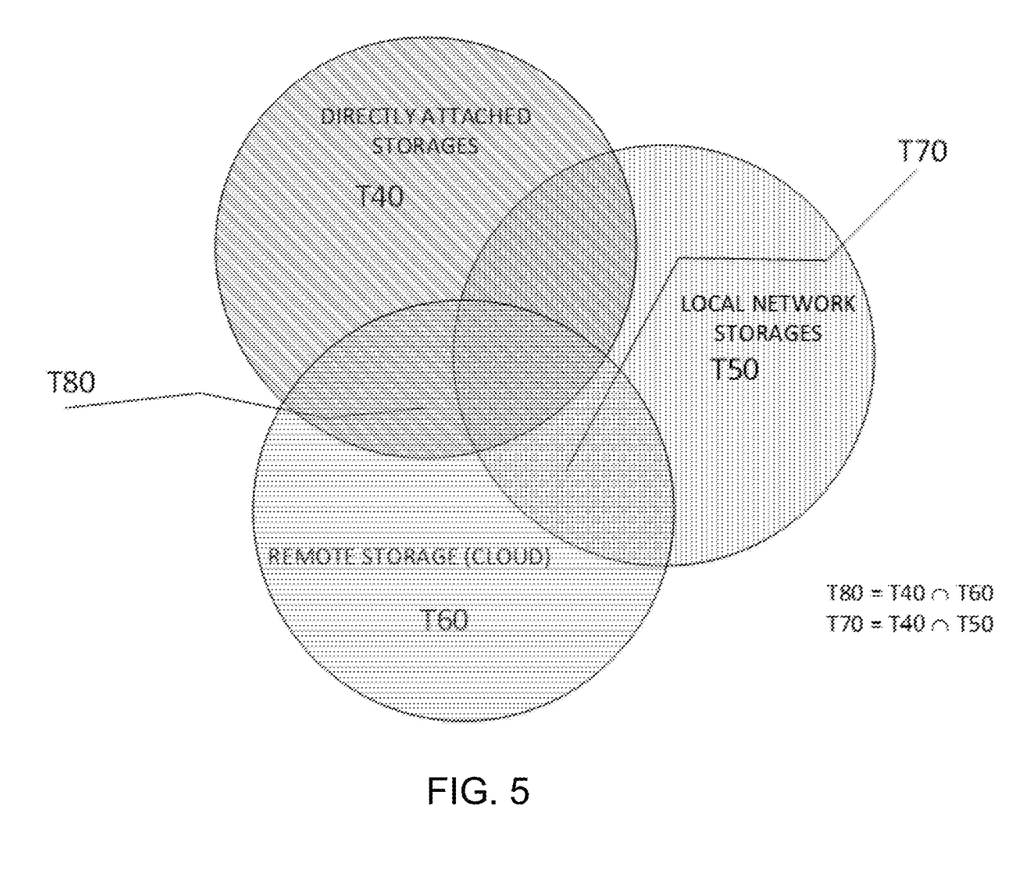
FIG. 5 is a diagram illustrating storage intersection in accordance with the present disclosure.

Referring now to FIG. 5, a user may synchronize his/her files with a remote cloud storage T60 (=cloud storage (200) on FIG. 1. Some of files which should be synchronized may be potentially found on the locally attached storages T40 (600 on FIG. 1) (e.g., USB disks, Flash drives, etc.) and on the storages in a local network T50 (e.g., NAS, Network shares etc.) The intersection of files restored/synchronized between T40 and T60 is T80 (i.e., it means that the required files are present both on T40 and T60 storages).

Still referring to FIG. 5, the intersection of files restored/synchronized between T50 and T60 is T80 (it means that the required files are present both on T50 and T60 storages). The storages T40 and T50 may be considered 'closest storages'. Access to them is usually faster than access to T40. In other words they have higher Vdownload and lower Tlatency. Thus, if we determine that the required files are on the nearest source, we may restore/synchronize them the closest sources.

Files may be identified by comparing there hashes. Additionally, the information regarding any 3rd party cloud storages (e.g., 201 and 202) may be used like Onedrive or Dropbox. For example, if the data stored there intersects with our data to be synchronized, we can use it as well, because some of file stores on such cloud services may be already present on media (100).

Further, IS process 10 may perform 212 a file hash calculation on a mounted storage source. The file hash calculation includes performing a hash calculation with regard to data items including restorable data items on a mounted storage source. The file has calculation can include performing hashes of any types of data items which can be restored including logical sectors, files, data blocks, application items (like MS Exchange emails, events and any other data items). Additionally, IS process 10 may compare 214 a hash file from the list of items with hashes of files from the mounted storage sources. Moreover, IS process 10 may, in response to determining a collision of hashes, synchronize or restore 216 the corresponding items from an appropriate mounted storage source. IS process 10 may find the best storage source for the file, or may do it dynamically in the recovery of every single file, or fragment. The best source for the file may be the source for which $S=(a*size/V+b*T)$, (where a and b are coefficients gleaned) is minimal. IS process 10 may further, in response to determining no matching hashes, synchronize or restore 218 the corresponding items from a backup archive. If there are no matching hashes, the file is restored from the backup archive.

For example, a completely synchronized OS may exist on the web storage. An OEM partition with OS may be stored on local disk. An empty partition may need to restore its OS. A restoration process may start. A list of files from a remote storage may be acquired. Hash-functions for each file may be calculated. A file list may be gathered from local storage. An intersection between two lists may be found by comparing hash functions. An intersected file may be copied from an OEM local disk (to, e.g., a target volume for example. Unique files from an online storage may be copied to local disk.

In an embodiment, a boot code may be copied. The boot code may be copied before the list of files from remote storage is acquired. A boot code may be a code which is used for initialization of a boot OS and may restore bootability. It may be added to 1-3 media. It may serve to preserve the possibility that to boot the system in case of system recovery.

Further, in an embodiment, a bootability restore step may include fixing registry entries to work in the IS. For example, registry is fixed because locations of partitions changed. It serves to preserve the possibility to boot the system in case of system recovery.

Restores boot (fix Windows registry, fix configuration files grub, lilo and etc.). Optionally, hardware drivers can be applied after restore because it may permit to restore the system to a system with another architecture (for example from AMD to Intel, from IDE to AHCI or to RAID) and so on. This may be referred to as Universal Restore. The drivers may be copied to the restored system. Drivers can be obtained either from one of the sources using the above algorithm, and without it. And from another source. Further, the drivers may be configured. Those performing the steps to offer the system to use copy the driver for a particular device type. For example, a Windows file may be copied to the directory c:\windows\inf.

As described herein, the backup/restore software and system components, in one embodiment, check, during a restore/synchronization, any available sources which potentially can store the data that will be subsequently restored. As an additional step which may be independent of other processes described herein or as part of such processes, additional checking of data relative to local disks or storage can be performed in lieu of using remotely stored data 405 which can be an image backup/backup archive that is stored remotely such as cloud storage (200) as shown in FIG. 6.

Figure 6:
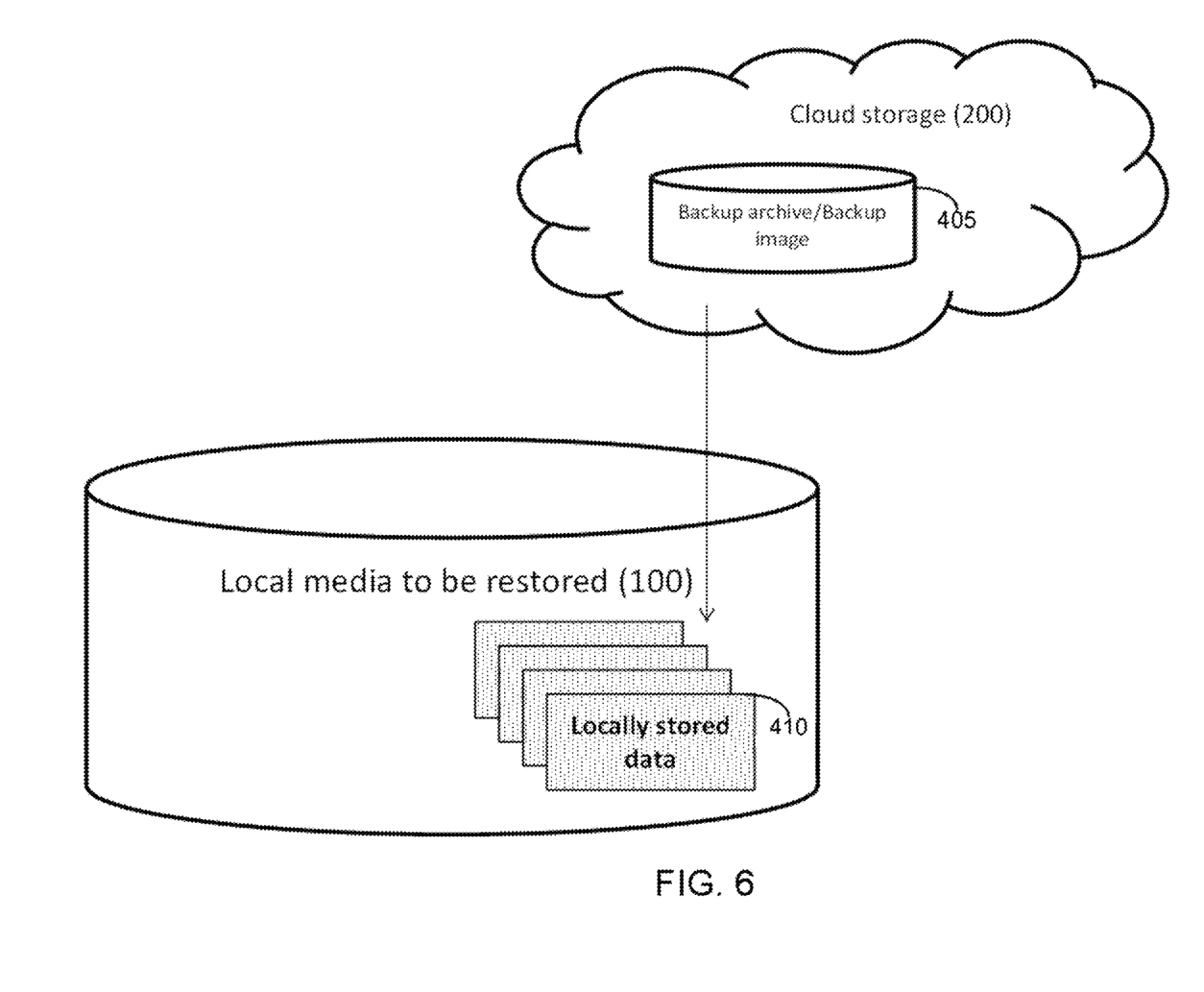
FIG. 6 is a schematic diagram illustrating various computer components and storage media and associated data exchanges illustrating steps local data checking steps for increasing speed during synchronization or restore in accordance with the present disclosure.

Additional details relating to an example of this type of implementation is shown in the schematic diagram of FIG. 6. FIG. 6 is a schematic diagram illustrating various computer components and storage media and associated data exchanges illustrating steps local data checking steps for increasing speed during synchronization or restore in accordance with the present disclosure. The steps of FIG. 6 including checking local storage for backup data files and the restore of such files in lieu of accessing remote files can be performed by the a server-side increasing speed (IS) application 10 or client-side IS applications 12, 14, 16, and 18.

In one embodiment, on a periodic basis, which can include frequent checks on a set schedule, the software components described herein, such for example applications 10, 12, 14, 16, and 18, can restore data to the same location where such data was previously stored. In different scenarios, the data could be lost because for different reasons, including a software failure/crash such as the partition structure (a partition table) on the disk could be damaged.

However, with such a failure or crash, physically, all the data on the local disk or other storage may remain untouched and useable for a restore process such as from applications 10, 12, 14, 16, and 18. For example, directories, files, disk sectors or any other items (e. g. application items) may remain stored locally and useable even if there is a software crash or other interruption or issue necessitating a restoration of data. Therefore, the backup/restore software applications 10, 12, 14, 16, and 18 can check whether the locally stored data 410 is suitable for use during a restore process is present on a local disk or other storage—local media to be restored (100) as shown in FIG. 6 and otherwise described herein. The local storage media (100) may be chosen for synchronization or restoration (e.g., may be target media to restore) or may need to synchronize its data with a remote storage/cloud storage (200). If the local data can be used 100 in lieu of the cloud data, the local data is used as shown in FIG. 6.

If the data is present on the disk or other storage, after performing the check of the physical storage and the locally stored data 410, the software then does not need to download such data from cloud. Instead, the backup/restore software can use a local instance of it from the disk or other storage. In one embodiment, during a restore/synchronization process, the restore software also checks the locally stored data 410 which can be used for the restore process if not physically damaged or otherwise rendered unsuitable. In one embodiment, the software restores the data to the same location (e. g. after software failure) in which the data was located prior to the failure. Any previously stored data 410 on a local drive, which can be the same as data 405 archived to a cloud storage, can be used as part of the restore process after checking the availability of the data on local storage.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionalities of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc.), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for increasing speed during synchronization or restore, the method comprising:
    acquiring a list of items to be synchronized or restored that are associated with a client computer;
    defining a set of available storage sources available to the client computer, wherein the set of available storage sources comprises a remote cloud storage source, one or more directly attached storage sources; and one or more storage sources in a local network, wherein the list of items are stored on one or more of the set of available storage sources;
    mounting the set of available storage sources to the client computer;
    determining a storage intersection of items in the list based on the items being available in more than one mounted storage device;
    in response to determining a set of items that has a storage intersection, synchronizing or restoring the items based on at least one of a speed of download and a network latency;
    in response to determining a set of items that does not have a storage intersection, synchronizing or restoring the items from a primary remote storage, and
    wherein prior to restoring the items from the primary remote storage, determining if the items are available at a local storage device; and if the items are available at the local storage device, restoring the items from the local storage device in lieu of restoring the items from the primary remote storage.

2. The method of claim 1, further comprising:
    performing a hash calculation with regard to restorable data items on a mounted storage source.

3. The method of claim 1, further comprising:
    comparing hash file from the list of items with hashes of files from the mounted storage sources; identifying one or more unique files using the hash comparison; and copying one or more unique files from the remote cloud storage source.

4. The method of claim 1, further comprising:
    in response to determining a collision of hashes, synchronizing or restoring the corresponding items from an appropriate mounted storage source.

5. The method of claim 1, further comprising:
    in response to determining no matching hashes, synchronizing or restoring the corresponding items from a backup archive.

6. A non-transitory computer program product residing on a computer readable storage medium having a plurality of instructions stored thereon, which, when executed by a processor, cause the processor to perform operations for increasing speed during synchronization or restore, the operations comprising:
    acquiring list of items to be synchronized or restored that are associated with a client computer;
    defining a set of available storage sources available to the client computer, wherein the set of available storage sources comprises a primary remote storage source, one or more directly attached storage sources; and one or more storage sources in a local network, wherein the list of items are stored on one or more of the set of available storage sources;
    mounting the set of available storage sources to the client computer;
    determining, using one or more logical operations performed by one or more processors, a storage intersection of items in the list based on the items being available in more than one mounted storage device, wherein one mounted storage device comprises local storage;
    in response to determining a set of items that has a storage intersection, synchronizing or restoring the items based on at least one of a speed of download and a network latency;
    in response to determining a set of items that does not have a storage intersection, synchronizing or restoring the items from the primary remote storage, and
    wherein prior to restoring or synchronizing the items from the primary remote storage, determining if the items are available at a local storage device; and if the items are available at the local storage device, restoring the items from the local storage device in lieu of restoring the items from the primary remote storage.

7. The non-transitory computer program product of claim 6, wherein the operations further comprise:
    performing a hash calculation with regard to a data item on a mounted storage source.

8. The non-transitory computer program product of claim 6, wherein the operations further comprise:
    comparing hash file from the list of items with hashes of files from the mounted storage sources.

9. The non-transitory computer program product of claim 6, wherein the operations further comprise:
    in response to determining a collision of hashes, synchronizing or restoring the corresponding items from an appropriate mounted storage source.

10. The non-transitory computer program product of claim 6, wherein the operations further comprise:
    in response to determining no matching hashes, synchronizing or restoring the corresponding items from a backup archive.

* * * * *